United States Patent
Yates, Jr. et al.

(10) Patent No.: US 8,875,271 B2
(45) Date of Patent: Oct. 28, 2014

(54) EXECUTING UNSIGNED CONTENT AND SECURING ACCESS IN A CLOSED SYSTEM

(75) Inventors: Ronnie Donnel Yates, Jr., Bothell, WA (US); Albert Sing Ho, Seattle, WA (US); Thomas Wayne Miller, Jr., Redmond, WA (US); Paul L. Bleisch, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 938 days.

(21) Appl. No.: 11/636,199

(22) Filed: Dec. 8, 2006

(65) Prior Publication Data

US 2008/0140958 A1 Jun. 12, 2008

(51) Int. Cl.
| | | |
|---|---|---|
| G06F 7/04 | (2006.01) | |
| G06F 15/16 | (2006.01) | |
| G06F 17/30 | (2006.01) | |
| H04L 29/06 | (2006.01) | |
| G06F 9/455 | (2006.01) | |
| G06F 21/62 | (2013.01) | |
| H04N 7/16 | (2011.01) | |
| G06F 1/26 | (2006.01) | |
| G06F 11/00 | (2006.01) | |
| G08B 13/00 | (2006.01) | |
| G06F 9/46 | (2006.01) | |
| G06F 9/54 | (2006.01) | |
| G06F 3/06 | (2006.01) | |

(52) U.S. Cl.
CPC ............ *G06F 21/6281* (2013.01); *G06F 9/545* (2013.01); *G06F 2221/2109* (2013.01); *G06F 3/0659* (2013.01); *G06F 9/455* (2013.01)
USPC ............... 726/10; 726/26; 726/30; 726/34; 713/165; 713/166; 713/167; 718/104

(58) Field of Classification Search
CPC ... G06F 3/0659; G06F 9/455; G06F 9/45504; G06F 9/45541; G06F 9/544; G06F 9/545
USPC ................ 726/16, 17, 21, 26, 27, 30, 10, 34; 718/1, 104; 713/165–167
See application file for complete search history.

(56) References Cited

U.S. PATENT DOCUMENTS 6,151,618 A * 11/2000 Wahbe et al. ................. 718/1
6,321,334 B1 * 11/2001 Jerger et al. .................. 726/1

(Continued)

FOREIGN PATENT DOCUMENTS

| JP | 11-112494 A | 4/1999 |
|---|---|---|
| JP | 2004-328359 A | 11/2004 |

(Continued)

OTHER PUBLICATIONS

Microsoft, "Microsoft Computer Dictionary Fifth Edition", 2002, Microsoft Press, $5^{th}$ edition, p. 76.*

(Continued)

*Primary Examiner* — Evans Desrosiers
*Assistant Examiner* — Daniel Potratz
(74) *Attorney, Agent, or Firm* — Tim Churna; Micky Minhas

(57) ABSTRACT

Mechanisms are disclosed that allow for execution of unsigned content and the securing of resources in a closed system when such unsigned content is executing on the system. For example, an access layer is used between an operating system layer of the closed system and the actual unsigned content. This access layer may contain various sub-layers, such as a graphics layer, an audio layer, an input layer, and a storage layer. These layers can control access that the unsigned content can have to the native operating system layers and the associated resources of the closed system. By providing such an access layer, unsigned content, e.g., video games, can run on the closed system that is typically designed to run only signed content.

16 Claims, 11 Drawing Sheets

(56) References Cited

U.S. PATENT DOCUMENTS

| | | | |
|---|---|---|---|
| 6,496,847 B1* | 12/2002 | Bugnion et al. | 718/1 |
| 7,266,688 B2* | 9/2007 | Fronberg | 713/164 |
| 7,392,376 B2* | 6/2008 | McKenney et al. | 713/152 |
| 7,441,113 B2* | 10/2008 | Chong et al. | 713/2 |
| 7,587,724 B2* | 9/2009 | Yeap | 719/328 |
| 7,594,111 B2* | 9/2009 | Kiriansky et al. | 713/166 |
| 7,603,704 B2* | 10/2009 | Bruening et al. | 726/22 |
| 7,647,589 B1* | 1/2010 | Dobrovolskiy et al. | 718/1 |
| 2002/0188649 A1* | 12/2002 | Karim | 709/104 |
| 2005/0111819 A1* | 5/2005 | Cormack et al. | 386/46 |
| 2005/0149726 A1* | 7/2005 | Joshi et al. | 713/164 |
| 2005/0223239 A1 | 10/2005 | Dotan | |
| 2005/0257265 A1 | 11/2005 | Cook et al. | |
| 2006/0146057 A1* | 7/2006 | Blythe | 345/506 |
| 2006/0156010 A1* | 7/2006 | Kim | 713/176 |
| 2007/0113291 A1* | 5/2007 | Dai et al. | 726/27 |
| 2008/0072285 A1* | 3/2008 | Sankaran et al. | 726/2 |

FOREIGN PATENT DOCUMENTS

| | | |
|---|---|---|
| JP | 2004-348397 A | 12/2004 |
| JP | 2006-244508 A | 9/2006 |
| JP | 2006-330835 A | 12/2006 |
| WO | WO 02/093369 A1 | 11/2002 |

OTHER PUBLICATIONS

J. Iliadis et al., "Towards Secure Downloadable Executable Content: The Java Paradigm," In: "Computer Safety, Reliability and Security", Jan. 1, 1998, Springer, Berlin Heidelberg, vol. 1516, pp. 117-127.

Scott K. et al., "Safe virtual execution using software dynamic translation", Computer Security Applications Conference, 2002. Proceedings 18$^{th}$ Ann. UAL Dec. 9-13, 2002, Piscataway, NJ, USA, IEEE, Dec. 9, 2002, pp. 209-218.

Extended European Search Report and European Search Opinion dated Oct. 17, 2011, for corresponding European application No. 07868783.7, 7 pages.

Garfinkel, T., "Terra: a virtual machine-based platform for trusted computing", ACM SOSP. Proc. ACM Symposium on Operating Systems Principles; Oct. 19, 2003, pp. 193-206, XP002340992.

Nair, R. et al., "The Architecture of Virtual Machines," Computer, IEEE Service Center, Los Alamitos, CA, US, vol. 38, No. 5, May 2005, pp. 32-38, XP011132214.

* cited by examiner

EXECUTING UNSIGNED CONTENT AND SECURING ACCESS IN A CLOSED SYSTEM

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2006, Microsoft Corp.

TECHNOLOGY FIELD

The present technology relates to the field of computing, and more particularly, to gaming environments.

BACKGROUND

Gaming systems are prevalent in today's computing environments. Game consoles are typically closed systems that only allow signed games controlled by hardware vendors to execute on such consoles. This restriction may be done for various reasons, whether to preserve the business model of having a tightly controlled environment for publishers, where piracy of intellectual property is kept to a minimum, or controlling the types games that can be played on a gaming system, for instance, to allow content that meets parental expectations for children playing such content. Additionally, allowing signed code to run helps to control and mitigate the potential for cheating on games in an online community, where certain assumptions, such as community scores or digital currency, are essential to be accurate.

However, these tight restrictions present on game consoles prevent the larger creative community as a whole from developing games or game-like applications on closed game consoles. Thus, it is important to address the need of allowing developers, gamers, general hobbyist, and student game developer communities, among others, to write games for a traditionally closed system. Additionally, it is important to address the problem of a burgeoning market of homebrew developers who spend the time and effort in order to hack game consoles in order to allow the running of unsigned code on such consoles (when they otherwise wouldn't have to expand such time and effort with the presently disclosed subject matter, below).

SUMMARY

Mechanisms are provided that allow for execution of unsigned content and the securing of resources in a closed system when such unsigned content is executing on the system. In one aspect of the presently disclosed subject matter, an access layer is used between an operating system layer of the closed system and the actual unsigned content. Moreover, this access layer may contain various sub-layers, such as a graphics layer, an audio layer, an input layer, and a storage layer. These layers can control the type and amount of access unsigned content can have to the native operating system layers and its associated resources.

In one exemplary and non-limiting aspect, any of the mentioned sub-layers can be composed of various buffers, such as an input buffer in user mode of the closed system, and a corresponding validation buffer in supervisor mode of the closed system, where information (code and/or data) may be copied from the former buffer to the latter buffer (to be validated in the latter buffer). Additionally, various other components can be used, such as ring buffers that may store commands that have been validated in the mentioned validation buffers.

It should be noted, that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included.

DETAILED DESCRIPTION

Overview

Figure 1:
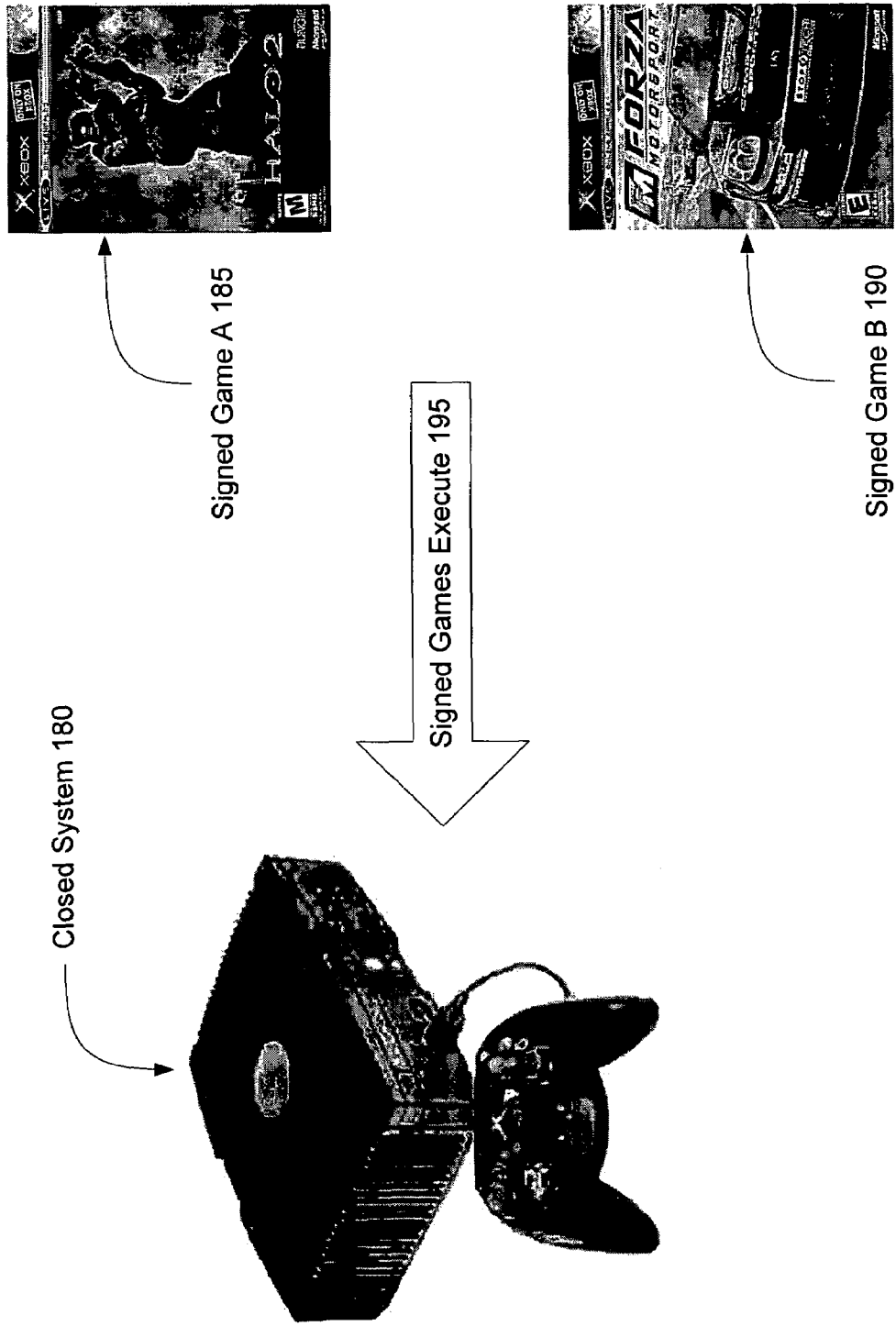
FIG. 1 illustrates a prior art system where only signed software components, namely, signed games, are able to run on a typically closed system.

Typically, game consoles only allow signed games to execute. To ensure that signed games do not expose a closed console in any expletive way, games are pushed through a process known as certification. Certification requires that games follow a stringent set of rules before games can be signed. These stringent rules are in place to prevent titles from unknowingly creating an exploit that could allow the closed console to be hacked in a fashion that is detrimental to the manufacturer, as well as content publishers. In particular, preventing piracy of content on closed consoles is important.

All games running on closed consoles will require access to resources such as memory, CPU access, GPU, optical disc drives, input devices, and persistent storage (such as hard disk drive). Because unsigned games do not go through the typical certification process required of signed games, system, methods, and computer readable media are disclosed herein to show ways of ensuring that data flowing from unsigned games into the protected resources is valid.

In one exemplary and non-limiting aspect of the present disclosure, all data is funneled through a resource management layer that handles validation of any data flowing back and forth from the unsigned games and the protected resources in a closed gaming console. This layer ensures that all protected resources cannot be accessed directly by an unsigned game, and ensures that all entry points into protected resources are well known. In the event that an unsigned game tries to access a protected resource incorrectly, or access a resource that is entirely off limits, the layer can immediately terminate all execution. Moreover, the entry points available from the resource management layer can be fixed and pre-determined by the console manufacturer. This can help to prevent unsigned code from arbitrarily creating new entry points.

Certain protected resources that are more dangerous can have another level of abstraction in place. A high-level buffer along with a specialized protocol can abstract most calls to the underlying resource. The calls in the high-level buffer at key points can be flushed into the resource management layer, and then be validated before being sent to the protected resources.

Finally, a resource management system can detect any activity such as security violation that is unexpected, and log the activity into a central location. This mechanism coupled with a unique user identification system, gives the console manufacturer a way to track the number of security violations grouped by a given user. The data presented by this system allows the console manufacturer the ability to track the origination of security exploits and deal with inviolate users appropriately.

Aspects of Unsigned Content in a Closed System

This section of the presently disclosed subject matter focuses on the executing of unsigned content in a closed system in such a way that such execution is secure (i.e. such that resources in the closed system are protected). In order to gain a better appreciation for these aspects, it is instructive to compare them to the prior art.

Thus, FIG. 1 illustrates a prior art system where only signed software components, namely, signed games, are able to run on a typically closed system. Specifically, a closed system 180 is depicted against which various signed games, such as game A 185 and game B 190, are able to execute 195. These games 185, 190 are typically authorized by the closed system 180 manufacturer, however, in some aspects they can be authorized by game developers or some other third parties. In any case, the system 180 is deemed "closed" in the sense that not every software application can run on it, as might be the case with a general purpose personal computer (a PC).

A typical signing process is well known in the art, and as was mentioned above, it serves a variety of purposes, such as limiting pirating of intellectual property and controlling who has access to the appropriate content. However, despite the numerous advantages of such a closed system 180, it unnecessarily restricts development of other "unsigned" games (games not officially authorized by a gaming authority). Such unsigned games can be games that build on top of existing games (even "signed" games, if permission is obtained from a publisher of such signed games) or they may be newly developed games that could not otherwise run on a closed system.

Figure 2:
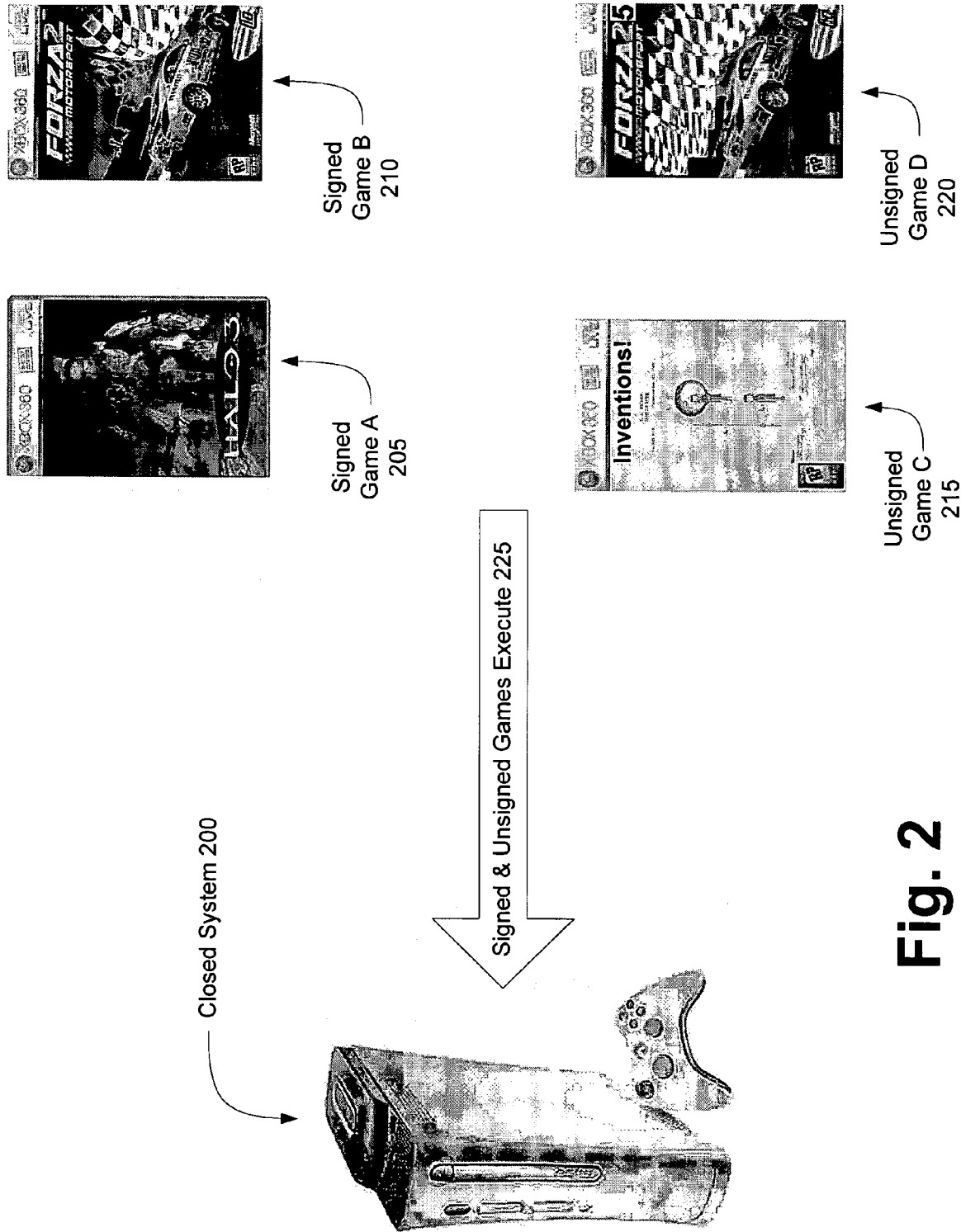
FIG. 2 illustrates a system where both signed and unsigned games are able to run on a closed system.

Thus, in contrast to FIG. 1, FIG. 2. illustrates a system where both signed and unsigned games are able to run on a closed system. A different closed system 200 vis-à-vis the closed system of FIG. 1, closed system 180, can run not only signed games A 205 and B 210, but also unsigned games C 215 and D 220. Although it should be noted, that the depicted closed systems 180 and 200 are merely exemplary and are not limited to any particular manufacturer or generation of computing device (abstract boxes for such system could have been shown instead of the concrete depictions in FIGS. 1 and 2).

As was mentioned above, allowing unsigned gaming content C 215 and D 220 to run on a system 200 that typically does not allow unsigned content to run, expands gaming capabilities of such a system 200. However, allowance of running unsigned gaming content 215, 220 also present security problems. Since games C 215 and D 220 are unsigned, i.e. they are not verified to be what they purport to be, malicious or undesired code and data can end up running on the gaming system 220. As will be explained shortly, with respect to FIG. 4, a security layer must be present. And this security layer not only allows unsigned games to run in the first place, but also additionally has the benefit of preventing undesired code and data from interacting with gaming system 200 resources.

Figure 3:
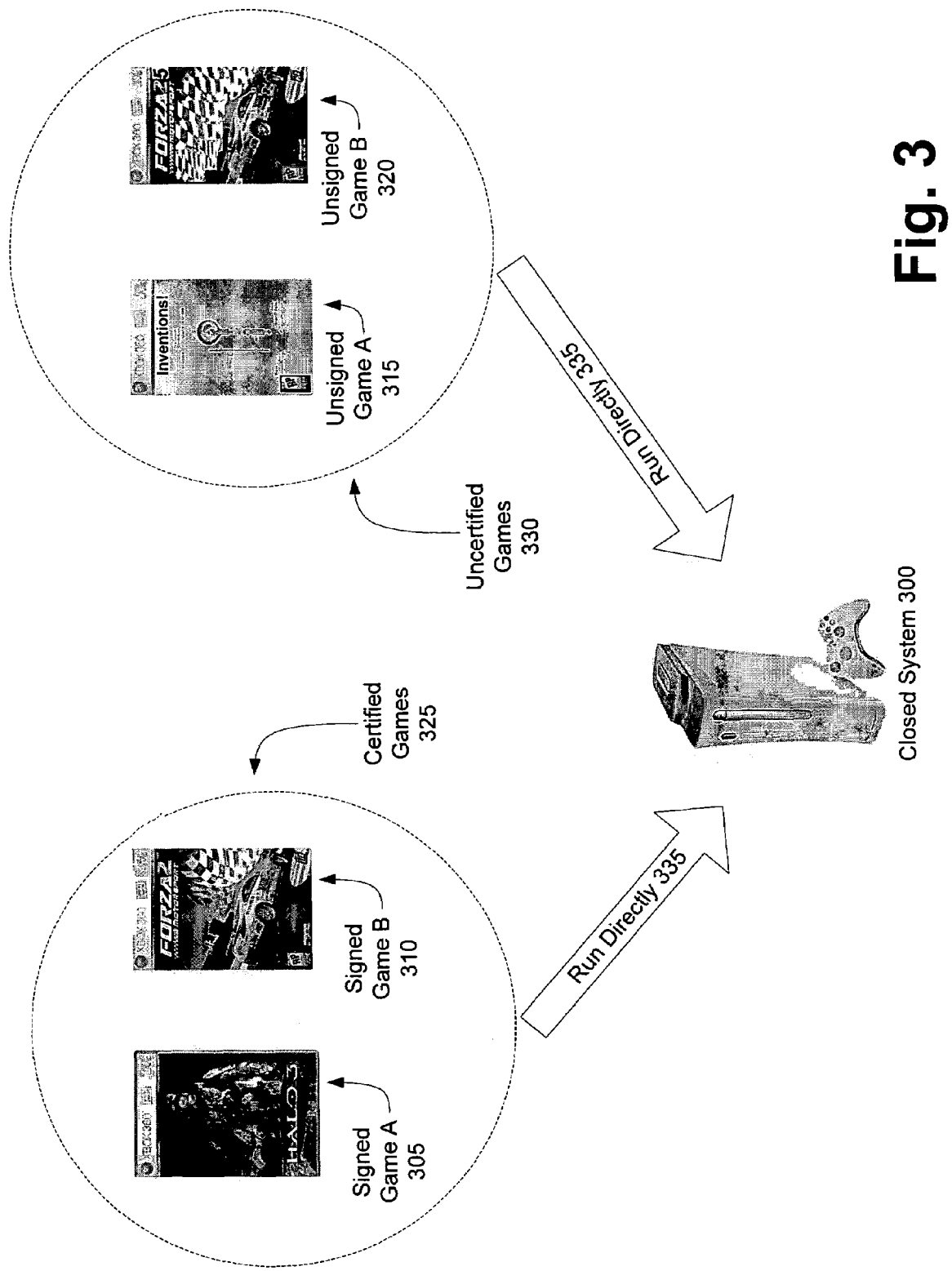
FIG. 3 illustrates that signed games are certified, and that unsigned games are not certified.

Next, FIG. 3 illustrates that signed games are certified, and that unsigned games are not certified. Specifically, games A 305 and B 310 are signed by some authentication or validation authority so that these games can run 335 on a specified closed system designated by the authority. Such signed games A 305 and B 310 are said to be certified 325. In contrast, uncertified games 330 are games that are not signed off by some such authority, namely, games A 315 and B 320, and so typically they cannot execute on the closed system 300. With the above and below aspects of the present disclosure, such games 315, 320 can run on the closed system 300 (in addition to the originally signed games A 305 and B 310).

Figure 4:
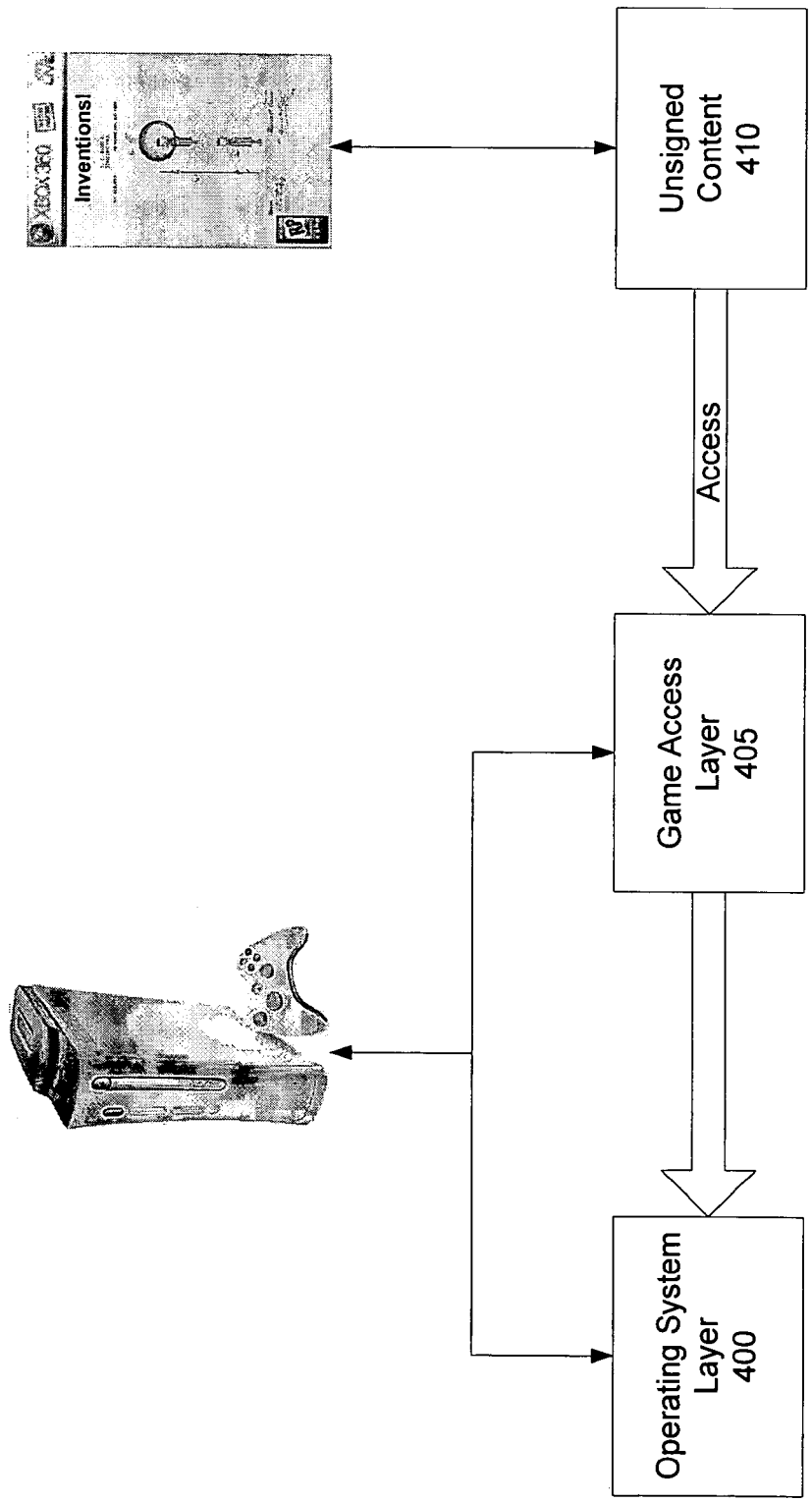
FIG. 4 illustrates that there is a game access layer between a gaming operating system and the unsigned content, where such an intervening layer controls access by the unsigned content.

Turning now to FIG. 4, it illustrates that there is a game access layer between a gaming operating system and the unsigned content, where such an intervening layer controls access by the unsigned content. The game access layer 405 is an abstraction (which is explained in more detail with reference to FIGS. 5 and 6, below). In short, it may be broadly understood to be a type of interface for unsigned content 410 to interact with. In actuality, it represents virtualized hardware for the unsigned content 410 so that the unsigned content 410 does not have to be strictly compatible with the operating system layer 400 (as would be the case with a signed gaming content, e.g. games A 305 and B 310 shown in FIG. 3).

Specifically, the access layer 405 shown as an abstraction in FIG. 4, is explained in more detail with reference to FIG. 5. The access layer 405 can comprise of at least six layers: a graphics layer 510, an audio layer 515, an input layer 520, a storage layer 525, a network layer 527, and a math layer 528. Each of these layers is responsible for a different task. For example, the graphics layer 510 may be responsible for rendering the graphics (including but not limited to flat shading, normal mapping, texture mapping, and so on); the audio layer 515, as is suggested by the title, may be responsible for the audio on a closed system (although it should be noted that such audio may or may not be associated with unsigned content—it could be independent audio obtained from a CD, a DVD, or some computer device file); the input layer 520 can be responsible for handling input form users, such as controller button selection, clicking using input devices, and so on;

the storage layer 525 can be responsible for storing certain gaming content or recalling certain gaming content (additionally, it can be used to allow for the running of legacy software by storing code and/or data that brings gaming content up to par with new console hardware); the network layer 527 can allow for multi-player gaming, where networking stacks on both the console side and any associated server side can be used to allow for on-line multi-player experience; and lastly, the math layer 528 may allow for the performance of certain math functions, e.g., to allow for more efficient map rendering (if graphics are involved). In any case, each of these layers 510, 515, 520, 525, 527, 528 helps to provide a secure gate between user mode 500 and supervisor (e.g. kernel) mode 505 that unsigned code, such as managed code 530, may need to go through to ensure secure computing (namely, so that unsigned code does not take over the underlying native OS layer 540 and any associated console resources for purposes unintended by console manufacturers or other interested parties).

Figure 5:
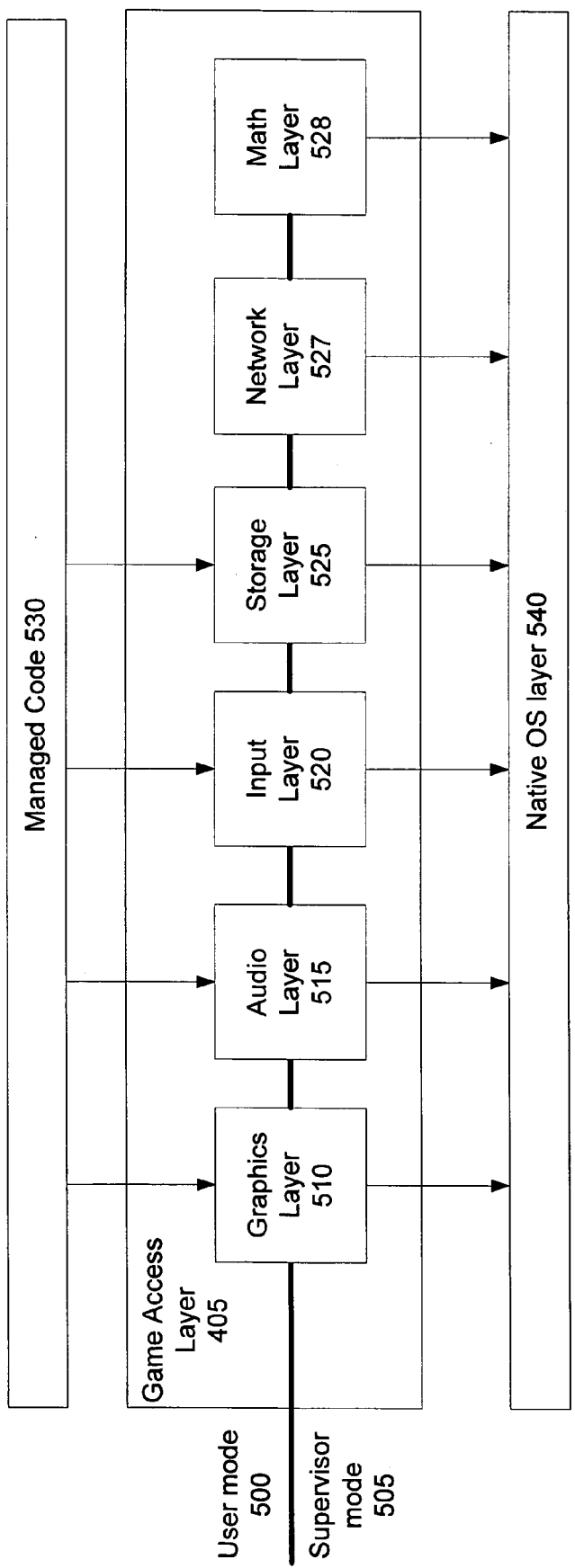
FIG. 5 illustrates the access layer shown as an abstraction in FIG. 4, in more detail with its various sub-layers, such as graphics, audio, input, and storage.

Thus, per FIG. 5, some managed code 530 that is associated with the aforementioned unsigned code is provided to the access layer 405, which may comprise of the various sub-layers 510, 515, 520, 525, 527, 528 discussed above. Managed code 530 is provided from the user mode 500 side, and filtered down through the sub-layers to the supervisor mode 505 side. These six layers 510, 515, 520, 525, 527, 528 ensure that (1) the proper interfaces are exposed to the managed code 530, and (2) that the managed code 530 will only access resources in the native OS layer 540 that it is supposed to access. Thus, overall, the access layer 405 plays a helpful role in the first instance, and a defensive role in the second instance, allowing unsigned content to execute, and preventing the wrong unsigned content from accessing certain resources, respectively. Otherwise, if the managed code 530 could directly access the native OS layer 540 in supervisor mode 505, such code 530 would have complete control over resources native to a gaming console. This, however, may not be desired, for the reasons listed above, namely, the use of the console for unintended manufacturer purposes.

Figure 6:
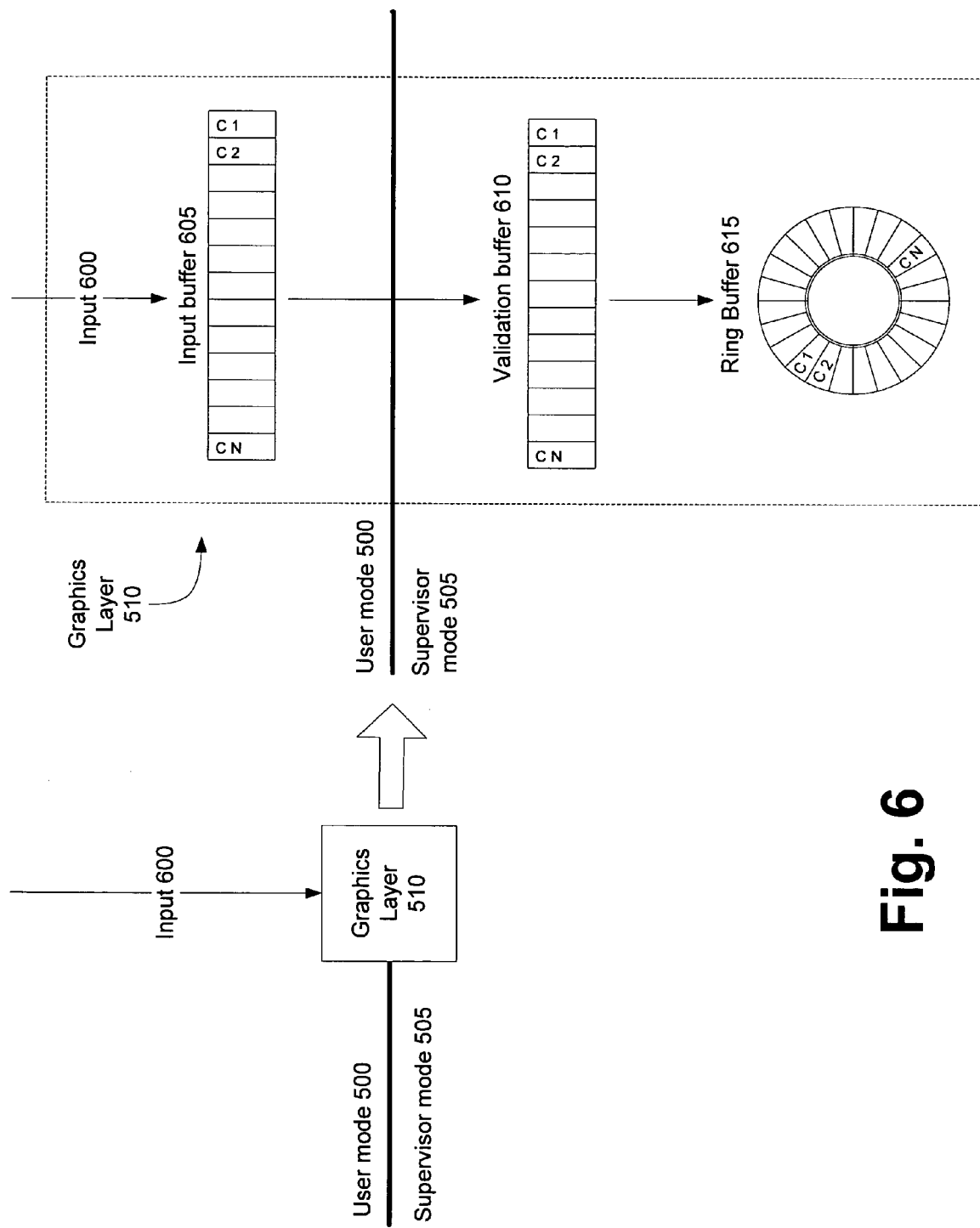
FIG. 6 illustrates in more detail the aspects discussed with reference to FIG. 5, namely, focusing on various buffers used by the sub-layers.

FIG. 6 illustrates in more detail the aspects discussed with reference to FIG. 5. For example, if one were to take one of the sub-layers discussed above, such as the graphics layer 510, and focus on its sub-components, they would looks something like the components shown on the right side of FIG. 6. First of all, the graphics layer 510 is shown on the left side of FIG. 6, and it may receive some input 600 (it may also provide output, but this aspect is limited to input present purposes).

Thus, the graphics layer 510 may have an input buffer 605 that receives the mentioned input 600. Those of skill in the art will readily appreciate the different types of buffers that could be used herein, such as vertex buffers, index buffers, vertex and pixel shaders, and so on. Once code and/or data is input, it can be copied from the user mode 500 side to the supervisor mode side 505. Thus, it is copied from the input buffer 605 into a validation buffer 610. In this validation buffer 610, information (code, data, or any other equivalent thereof) can be validated to make sure it is the type of information that is supposed be allowed access to the supervisor mode 505.

The standard of what is supposed to be allowed in supervisor mode 505 can be defined by the console manufacturer or other third party, and it can be continuously updated and monitored by such parties. Hence, a check is made regarding the information stored in the validation buffer 610. For example, handles can be validated in the validation buffer 610, where "handles" are understood to be tokens, typically pointers, which enable a program to access a resource, such as a library function or some hardware resource, as discussed above. If this information is valid, it can then be passed down to a ring buffer 615 for execution against native console resources.

Of course, it is understood that other buffer architectures can be used given the type of information that is input 600. The ring buffer 615 aspect may be used when commands are stored in the validation buffer 610. If, on the other hand, parameters to commands are provided, the ring buffer 615 may not be needed.

Figure 7:
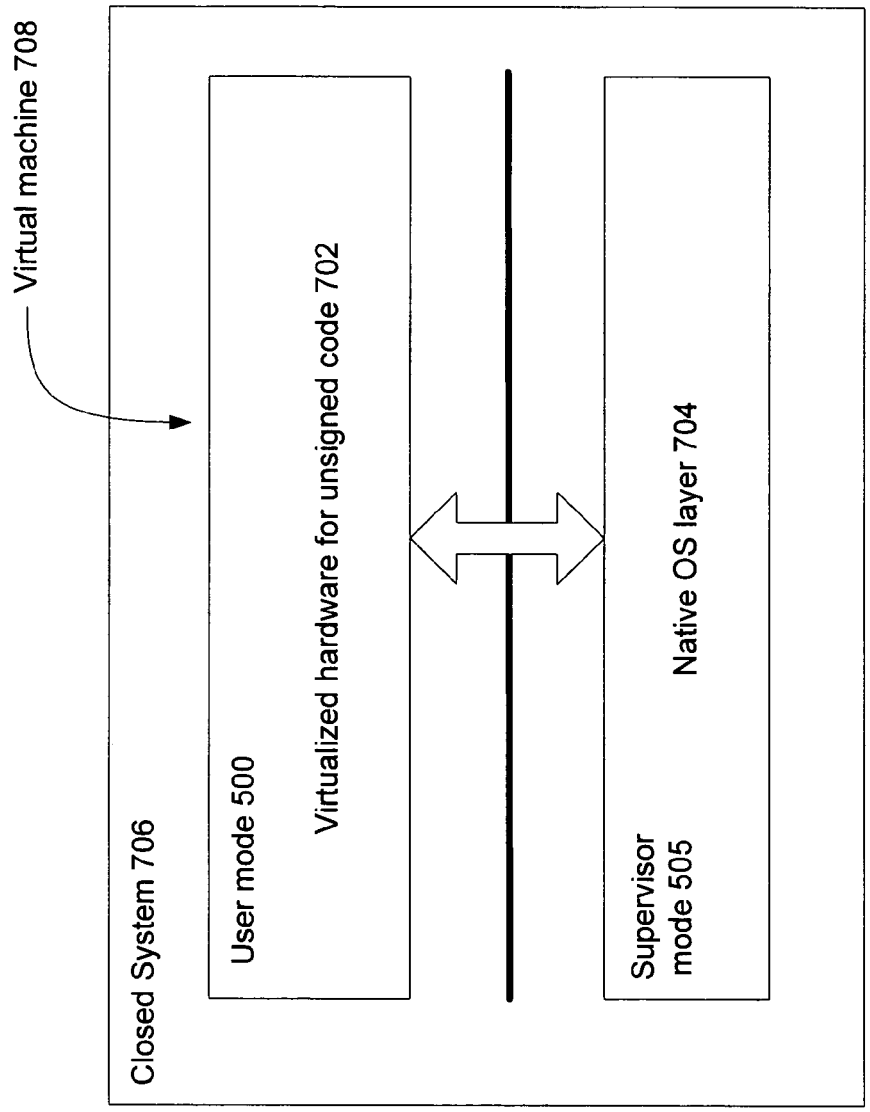
FIG. 7 illustrates that what the closed system is doing is virtualizing hardware for unsigned code to execute against.

In a different aspect of the presently disclosed subject matter, FIG. 7 illustrates that what the closed system is doing is virtualizing hardware for unsigned code 702 to execute against. Thus, in essence, a virtual environment in the form of a virtual machine 708 is created where unsigned code can execute. Such unsigned code can run in user mode 500, hence having limited control over system 706 resources that it would otherwise have in supervisor mode 505. The native OS layer 704 can virtualize the software and hardware appropriate for an unsigned code, and provide to the code only the desired set of resources it can access and/or control.

It would be appreciated by those of skill in the art, that various such virtual machines 708 could be used, each having a different virtual environment for each respective unsigned game. Alternatively, some universal virtual machine standard could be used for all or some significant subset of unsigned games to execute in. These, then, are merely implementation details that are contemplated by the over-arching disclosure herein of a closed system 706 providing a virtual machine environment for unsigned games to run in.

Figure 8:
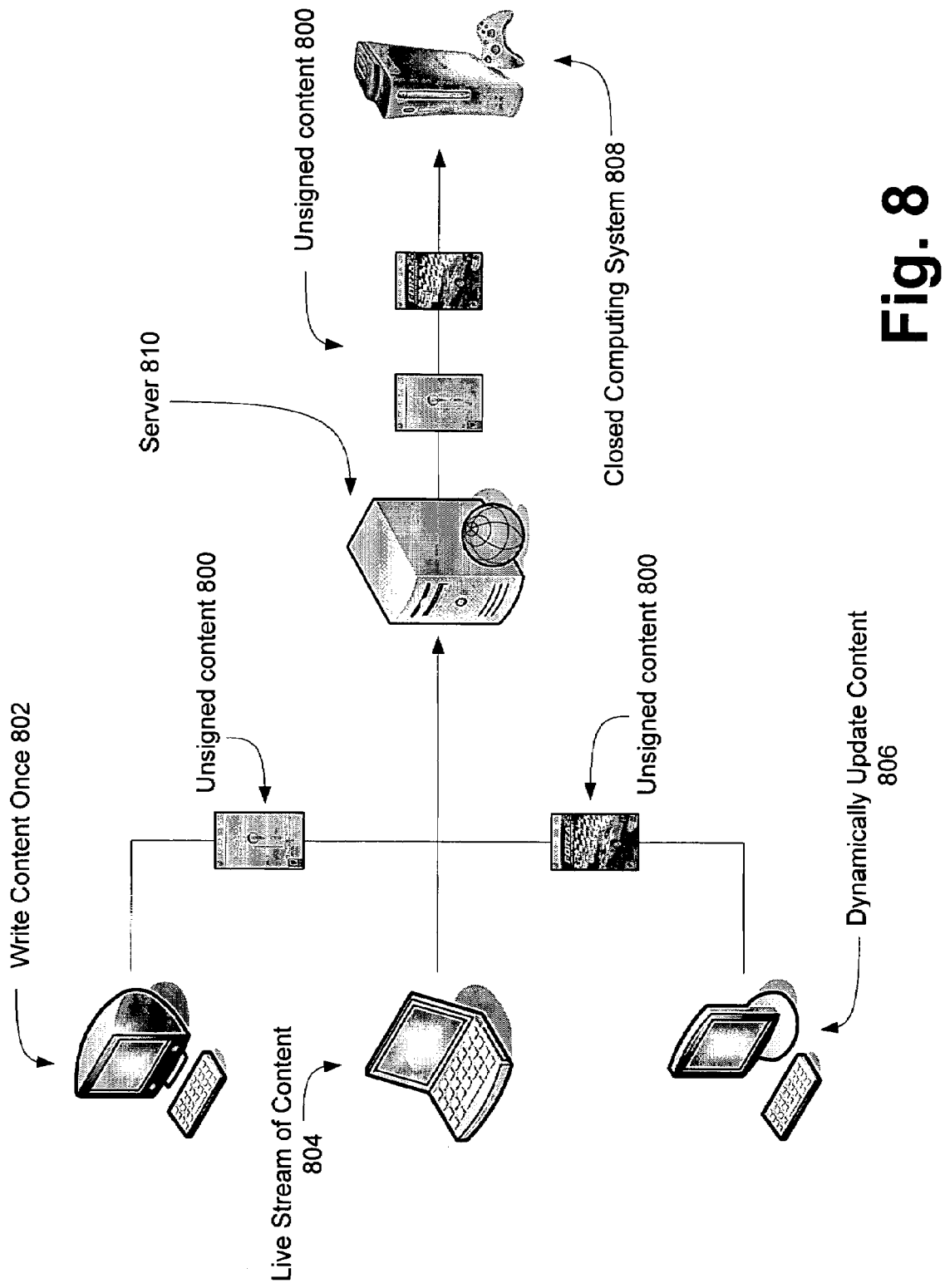
FIG. 8 illustrates that there is a myriad of ways in which unsigned content can be provided from some computing source to a closed system.

Lastly, there is a myriad of ways in which unsigned content can be provided from some computing source to a closed system, as is shown in FIG. 8. This aspect is meant to illustrate that the access layer 504 mentioned in FIG. 4, and discussed in detail with reference to FIGS. 5, and 6, can handle various types of unsigned content. The types of content contemplated in this aspect can include content that is provided only once 802 to the access layer of the closed computing system 808, content that is streamed 804 to the system 806, or content that is periodically and dynamically 808 provided to the system 808.

Various types of content providing architectures are contemplated herein. One type may have an intervening server 810 between the computing sources 802, 804, 806 and the closed system 808, while other types may have direct connection between a computing source and the closed system 808. Those of skill in the art will readily appreciate the various ways in which content can be delivered to a closed system. Once content is provided to the closed system 808, the system 808 can take this content and run it through the access layer 405 shown in FIG. 4, the various graphics 510, audio 515, input 520, and storage 525 layers shown in FIG. 5, and the various buffers 605, 610, and 615 shown in FIG. 6. The manner in which information is received, stored, and passed down to the system 808 resources will depend on the restrictions placed by system 808 manufacturers in the access layer, and thus on the contents of unsigned content.

Exemplary Computing Device

Figure 9:
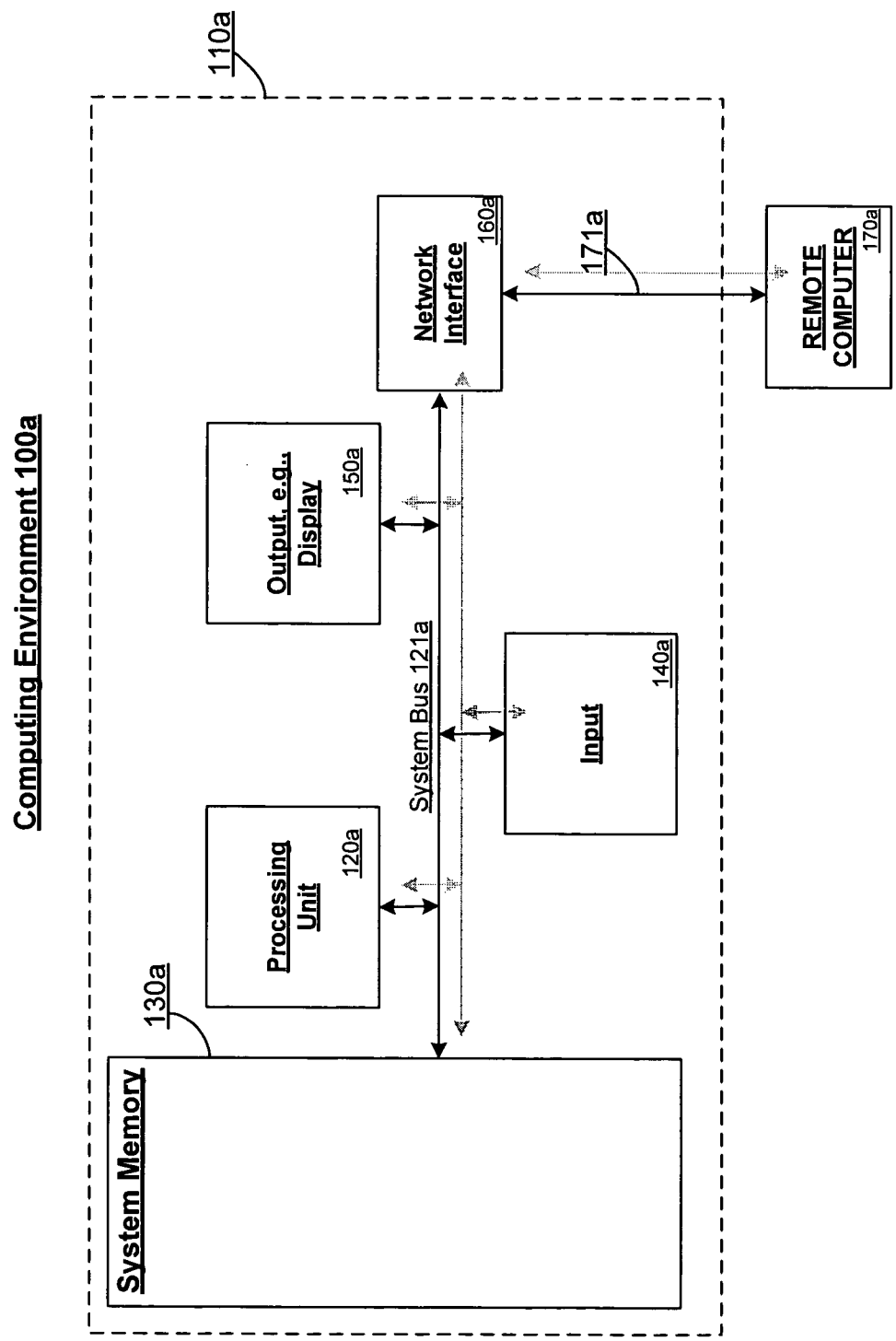
FIG. 9 illustrates a block diagram representing an exemplary non-limiting computing system environment to on which unsigned content can execute in accordance with the presently disclosed subject matter.

As mentioned, the presently disclosed subject matter applies to any device wherein it may be desirable to run unsigned content on an otherwise closed system. It should be understood, however, as indicated above, that other equivalent content to that of unsigned content can work with presently disclosed computing objects of all kinds. Accordingly, the below general purpose remote computer described below in FIG. 9 is but one example, and the present subject matter may be implemented with any client or portable device, whether standalone or having network/bus interoperability and interaction. Thus, the present subject matter may be implemented in an environment of networked hosted services in which very little or minimal client resources are implicated, e.g., a networked environment in which the client device serves merely as an interface to the network/bus, such as an object placed in an appliance.

Although not required, the present subject matter can partly be implemented via an operating system, for use by a developer of services for a device or object, and/or included within application software that operates in connection with the present subject matter. Software may be described in the general context of computer-executable instructions, such as program modules, being executed by one or more computers, such as client workstations, servers or other devices. Those skilled in the art will appreciate that the present subject matter may be practiced with other computer system configurations and protocols.

FIG. 9 thus illustrates an example of a suitable computing system environment 100a in which the various aspects described with reference to FIGS. 2-8 may be implemented, although as made clear above, the computing system environment 100a is only one example of a suitable computing environment for execution device and is not intended to suggest any limitation as to the scope of use or functionality of these various aspects. Neither should the computing environment 100a be interpreted as having any dependency or requirement relating to any one or combination of components illustrated in the exemplary operating environment 100a.

With reference to FIG. 9, an exemplary remote device for implementing the aforementioned aspects includes a general purpose computing device in the form of a computer 110a. Components of computer 110a may include, but are not limited to, a processing unit 120a, a system memory 130a, and a system bus 121a that couples various system components including the system memory to the processing unit 120a. The system bus 121a may be any of several types of bus structures including a memory bus or memory controller, a peripheral bus, and a local bus using any of a variety of bus architectures.

Computer 110a typically includes a variety of computer readable media. Computer readable media can be any available media that can be accessed by computer 110a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110a. Communication media typically embodies computer readable instructions, data structures, program modules or other data in a modulated data signal such as a carrier wave or other transport mechanism and includes any information delivery media.

The system memory 130a may include computer storage media in the form of volatile and/or nonvolatile memory such as read only memory (ROM) and/or random access memory (RAM). A basic input/output system (BIOS), containing the basic routines that help to transfer information between elements within computer 110a, such as during start-up, may be stored in memory 130a. Memory 130a typically also contains data and/or program modules that are immediately accessible to and/or presently being operated on by processing unit 120a. By way of example, and not limitation, memory 130a may also include an operating system, application programs, other program modules, and program data.

The computer 110a may also include other removable/non-removable, volatile/nonvolatile computer storage media. For example, computer 110a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 121a through a non-removable memory interface such as an interface, and a magnetic disk drive or optical disk drive is typically connected to the system bus 121a by a removable memory interface, such as an interface.

In addition to a user being able to provide input to the closed computing device via controllers, a user may enter commands and information into the computer 110a through input devices such as a keyboard and pointing device, commonly referred to as a mouse, trackball or touch pad. In addition to such peripheral devices, other input devices may include a microphone, joystick, game pad, satellite dish, scanner, or the like. These and other input devices are often connected to the processing unit 120a through user input 140a and associated interface(s) that are coupled to the system bus 121a, but may be connected by other interface and bus structures, such as a parallel port, game port or a universal serial bus (USB). A graphics subsystem may also be connected to the system bus 121a. A monitor or other type of display device is also connected to the system bus 121a via an interface, such as output interface 150a, which may in turn communicate with video memory. In addition to a monitor, computers may also include other peripheral output devices such as speakers and a printer, which may be connected through output interface 150a.

The computer 110a may operate in a networked or distributed environment using logical connections to one or more other remote computers, such as remote computer 170a, which may in turn have media capabilities different from device 110a. The remote computer 170a may be a personal computer, a server, a router, a network PC, a peer device or other common network node, or any other remote media consumption or transmission device, and may include any or all of the elements described above relative to the computer 110a. The logical connections depicted in FIG. 9 include a network 171a, such local area network (LAN) or a wide area network (WAN), but may also include other networks/buses. Such networking environments are commonplace in homes, offices, enterprise-wide computer networks, intranets and the Internet.

When used in a LAN networking environment, the computer 110a is connected to the LAN 171a through a network interface or adapter. When used in a WAN networking environment, the computer 110a typically includes a modem or other means for establishing communications over the WAN, such as the Internet. A modem, which may be internal or external, may be connected to the system bus 121a via the user input interface of input 140a, or other appropriate mechanism. In a networked environment, program modules depicted relative to the computer 110a, or portions thereof, may be stored in a remote memory storage device. It will be appreciated that the network connections shown and described are exemplary and other means of establishing a communications link between the computers may be used.

Exemplary Multimedia (Closed) Console Environment

Figure 10:
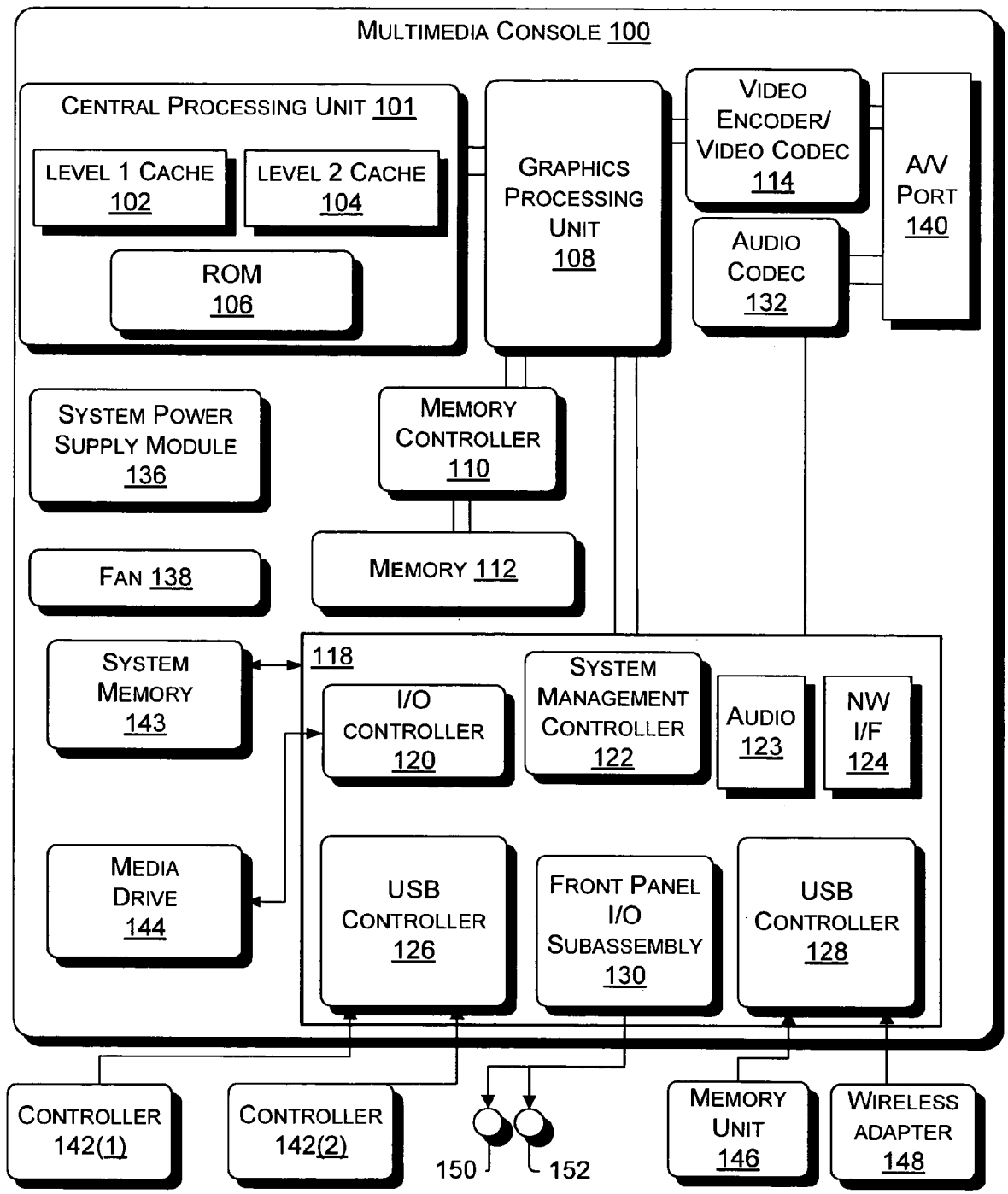
FIG. 10 illustrates a block diagram showing an exemplary non-limiting multimedia console device on which said unsigned content can execute in accordance with another aspect of the presently disclosed subject matter.

Referring next to FIG. 10, shown is a block diagram illustrating another exemplary non-limiting computing device, i.e., an exemplary multimedia console, which may be closed to a limited amount of software components being signed by some signing authority (whether the closed device maker or some gaming publisher). FIG. 10 shows the functional components of a multimedia console 100 in which aspects of the presently disclosed subject matter may be implemented. The multimedia console 100 has a central processing unit (CPU) 101 having a level 1 (L1) cache 102, a level 2 (L2) cache 104, and a flash ROM (Read-only Memory) 106. The level 1 cache 102 and level 2 cache 104 temporarily store data and hence reduce the number of memory access cycles, thereby improving processing speed and throughput. The flash ROM 106 may store executable code that is loaded during an initial phase of a boot process when the multimedia console 100 is powered. Alternatively, the executable code that is loaded during the initial boot phase may be stored in a FLASH memory device (not shown). Further, ROM 106 may be located separate from CPU 101.

This Console may have a variety of resources available to it, such as, a graphics processing unit (GPU) 108 and a video encoder/video codec (coder/decoder) 114 from a video processing pipeline for high speed and high resolution graphics processing. In this setup, data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 and CPU 101 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory unit 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless interface components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 126 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on or rebooted, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 may allow one or more users to interact with the system, watch movies, listen to music, and the like. However, with the integration of broadband connectivity made available through the network interface 124 or the wireless adapter 148, the multimedia console 100 may further be operated as a participant in a larger network community.

The multimedia console depicted in FIG. 10 is a typical multimedia console that may be used to execute a multimedia application, such as, for example, a game. Multimedia applications may be enhanced with system features including for example, system settings, voice chat, networked gaming, the capability of interacting with other users over a network, e-mail, a browser application, etc. Such system features enable improved functionality for multimedia console 100, such as, for example, players in different locations can play a common game via the Internet.

Also, over time, system features may be updated or added to a multimedia application. Rather than requiring the multimedia developer to make significant modifications to the multimedia application to provide these system features, the systems and methods described herein allow a multimedia developer to provide system features through separate system applications that work in conjunction with the multimedia application. For example, a system application may embody functionality related to networked capabilities, thereby enabling a multimedia application to be readily adapted to provide networked capabilities with little work by the multimedia (e.g., game) developer. One such capability is that of system level notifications for multiple and networked users. Making system level notifications part of a system application as opposed to being handled by individual multimedia applications, such as games running on the system, takes handling displaying notifications such as game invitations out of the development process for multimedia application developers and allows them to focus on the multimedia application itself.

Figure 11:
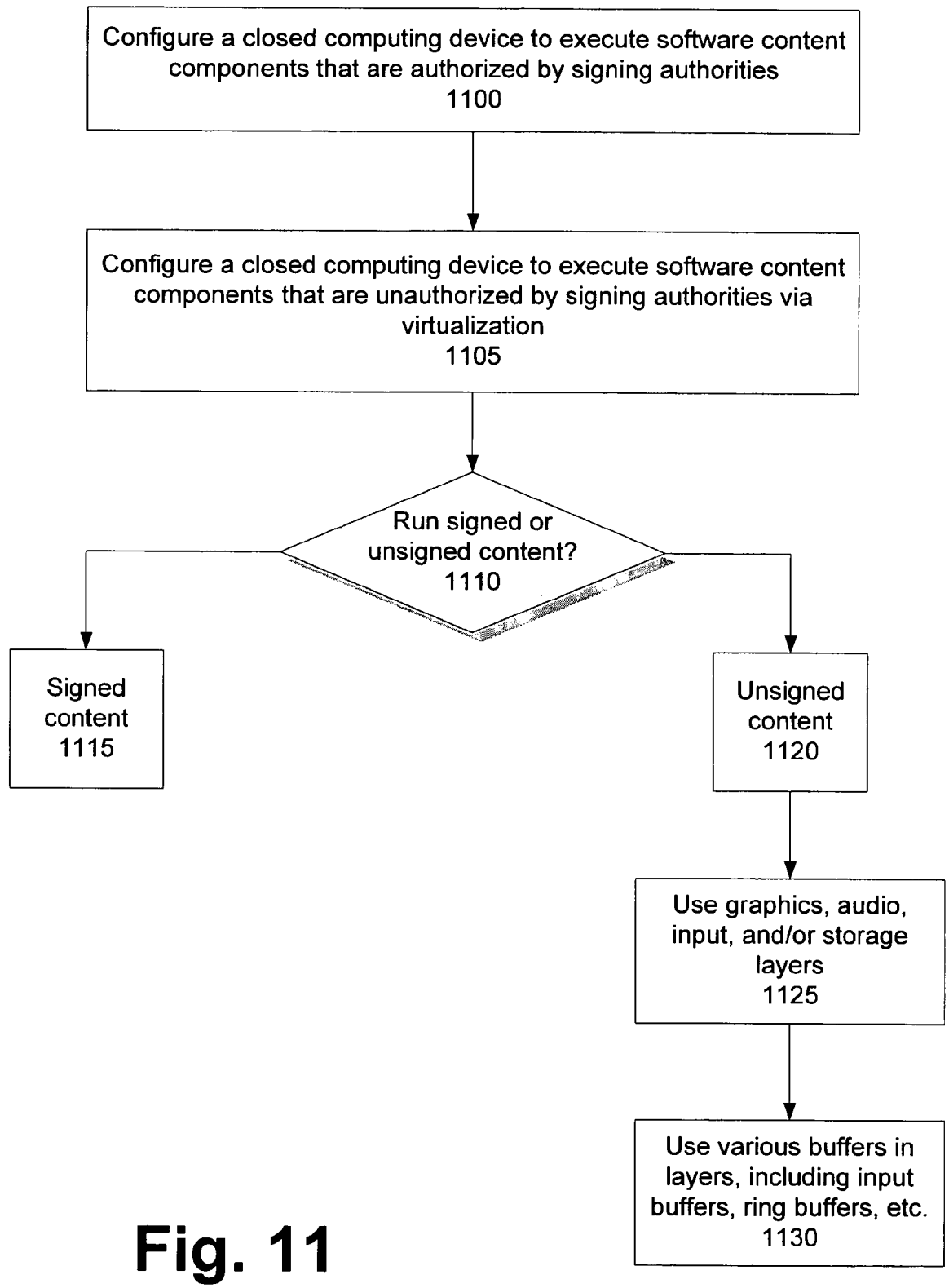
FIG. 11 illustrates in block diagram form execution of unsigned content and securing access in a closed system.

As mentioned above, while exemplary embodiments of the present subject matter have been described in connection with various computing devices and network architectures, the underlying concepts may be applied to any computing device or system in which an input device may be utilized to control the device or system. For instance, the algorithm(s) and hardware implementations of the discussed aspects may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. FIG. 11 illustrates one way of implementing an algorithmic flow for allowing unsigned code to run on closed hardware; however, one of ordinary skill in the art will appreciate that there are numerous ways of providing object code and nomenclature that achieves the same, similar or equivalent functionality achieved by the various embodiments of this subject matter.

As mentioned, the various techniques described herein may be implemented in connection with hardware or software or, where appropriate, with a combination of both. Thus, the methods and apparatus of the present subject matter, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed aspects. In the case of program code execution on programmable computers, the computing device generally includes a processor, a storage medium readable by the processor (including volatile and non-volatile memory and/or storage elements), at least one input device, and at least one output device. One or more programs that may implement or utilize any software provided in accordance with the these aspects are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the presently disclosed aspects may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the presently disclosed subject matter. When implemented on a general-purpose processor, the program code combines with the processor to provide a unique apparatus that operates to invoke the functionality of the present subject matter. Additionally, any storage techniques used in connection with the present aspects may invariably be a combination of hardware and software.

While the aspects described above have been described in connection with the preferred embodiments of the various figures, it is to be understood that other similar embodiments may be used or modifications and additions may be made to the described embodiment for performing the same function without deviating therefrom. For example, one skilled in the art will recognize that the methods, as described in the present application may apply to any computing device or environment, such as a gaming console, handheld computer, portable computer, etc., whether wired or wireless, and may be applied to any number of such computing devices connected via a communications network, and interacting across the network.

Furthermore, it should be emphasized that a variety of computer platforms, including handheld device operating systems and other application specific operating systems are contemplated, especially as the number of wireless networked devices continues to proliferate. Still further, functionality of the present subject matter may be implemented in or across a plurality of processing chips or devices, and storage may similarly be effected across a plurality of devices. Therefore, the presently discussed aspects should not be limited to any single embodiment, but rather should be construed in breadth and scope in accordance with the appended claims.

SUMMARY

In summary, various methods, system, and computer readable can embody the various aspects discussed above. For example, the following aspect is contemplated in FIG. 11 for executing unsigned content and securing access in a closed system. In FIG. 11 at block 1100, such execution and securing can be accomplished using a closed computing device, such a gaming console, wherein the closed computing device is configured to execute software content components that are authorized by signing authorities, i.e., for instance, signed software. Moreover, unsigned software content components can execute on such closed computing devices, wherein the unsigned software content components execute on the closed computing device by having the closed computing device virtualize interfaces, i.e. provide inputs so that unsigned software can be executed against a closed system, as is shown at block 1105. Thus, the term "interfaces" herein, contemplates a broad definition of any inputs and outputs that would be typically used by software. Such virtualized interface are provided in addition to providing the typical interfaces for signed software content components that are authorized by said signing authorities. Thus, at block 1100, a decision is made whether signed content is being run, at block 1115, or unsigned content, at block 1120. The former case is the traditional case discussed with reference to FIG. 1. The latter case, discussed herein in detail with reference to FIGS. 2-8, provides an expanded use of closed gaming systems.

Thus, as was mentioned already above, and as is illustrated in FIG. 11 at block 1125, the aforementioned interfaces can correspond to at least one of a graphics layer, an audio layer, an input layer, and a storage layer (originally depicted in FIG. 5, above). Moreover, at least one of the graphics layer, the audio layer, the input layer, and the storage layer can comprise of various buffers, as shown at block 1130, such as a first buffer into which data associated with the unsigned software content components is stored, and a second buffer into which the data is copied from the first buffer (wherein the data is validated in said second buffer). These aspects are clearly shown in FIG. 6. Thus, the data, upon said validation, can be provided to resources (such as memory, CPU access, GPU, optical disc drives, input devices, hard disk drive, etc.) associated with the closed computing device. Alternatively, the data, upon such validation, can be provided to a ring buffer before being provided to such resources associated with the closed computing device. This, however, is merely one exemplary and non-limiting aspect of the presently disclosed subject matter, as those of skill in the art will readily appreciate.

As was mentioned above with regard to other figures, such as FIG. 8, unsigned software content components (e.g. user or developer made games) can be provided to the closed computing device via a connection from a computing device (or alternatively, in the nominal case, via a DVD or some other optical, magnetic or equivalent device). Furthermore, such providing can be accomplished dynamically via a communication from a computing device (whether a PC, a server, or other gaming console) or, alternatively, it can be accomplished by streaming unsigned content from such a computing device. This Summary, of course, is not limiting but merely exemplary. It is apparent that other aspects not discussed herein but discussed above, such as assigning a unique user identification to the closed computing device and tracking any violations of the closed computing device via said unique user identification, are also contemplated herein albeit not explicitly mentioned in this Summary.

The invention claimed is:

1. A system for executing unsigned content and securing access in a closed system, comprising:
    a closed computing device, said closed computing device configured to execute signed software content components that are authorized by signing authorities to operate on any one of a plurality of closed computing devices; and
    at least one unsigned software content component, said at least one unsigned content component configured to execute on said closed computing device by having said closed computing device virtualize one or more hardware interfaces associated with one or more respective hardware resources of the closed computing device in order to prevent direct access to the one or more respective hardware resources while allowing indirect access to the one or more respective hardware resources for said at least one unsigned software content component, wherein the one or more virtualized hardware interfaces are managed by an access layer comprising a first buffer maintained in a user mode into which commands issued by said at least one unsigned software content component are stored, and a second buffer maintained in a supervisor mode into which the commands stored in the first buffer are copied, wherein the access layer validates the copied commands in the second buffer prior to allowing the commands to execute and access the one or more respective hardware resources.

2. The system according to claim 1, wherein said access layer corresponds to at least one of a graphics layer, an audio layer, an input layer, and a storage layer.

3. The system according to claim 1, wherein said commands, upon said validation, are copied to a ring buffer before being executed.

4. The system according to claim 1, wherein said at least one unsigned software content component is provided to said closed computing device via a connection from a computing device.

5. The system according to claim 1, wherein said at least one unsigned software content component is provided to said closed computing device using one of (a) dynamic communication from a computing device and (b) streaming from said computing device.

6. A method for executing unsigned content and securing access in a closed system, comprising:
    executing, by a closed computing device, signed software content components that are authorized by signing authorities to operate on any one of a plurality of closed computing devices; and
    executing, by said closed computing device, at least one unsigned software content component on said closed computing device, said at least one unsigned content component executes on said closed computing device by having said closed computing device virtualize one or more hardware interfaces associated with one or more respective hardware resources of the closed computing device in order to prevent direct access to the one or more respective hardware resources while allowing indirect access to the one or more respective hardware resources for said at least one unsigned software content component, wherein said one or more virtualized hardware interfaces are managed by an access layer comprising a first buffer maintained in a user mode into which commands issued by said at least one unsigned software content component are stored, and a second buffer maintained in a supervisor mode into which the commands stored in the first buffer are copied, wherein the access layer validates the copied commands in the second buffer prior to allowing the commands to execute and access the one or more respective hardware resources.

7. The method according to claim 6, further comprising assigning a unique user identification to said closed computing device and tracking any violations of said closed computing device via said unique user identification by logging violations on a per user basis.

8. The method according to claim 6, further comprising using said access layer, wherein said access layer corresponds to at least one of a graphics layer, an audio layer, an input layer, and a storage layer.

9. The method according to claim 6, further comprising providing said at least one unsigned software content component to said closed computing device via a connection from a computing device.

10. The method according to claim 6, further comprising providing said at least one unsigned software content component to said closed computing device using one of (a) dynamic communication from a computing device and (b) streaming from said computing device.

11. A computer readable storage medium device having stored thereon computer executable instructions for executing unsigned content and securing access in a closed system, wherein the instructions, upon execution by a computing device, cause the computing device at least to:
    configure a closed computing device to execute signed software content components that are authorized by signing authorities to operate on any one of a plurality of closed computing devices; and
    configure said closed computing device to execute at least one unsigned software content component on said closed computing device, said at least one unsigned content component executes on said closed computing device by having said closed computing device virtualize one or more hardware interfaces associated with a one or more respective hardware resources of the closed computing device in order to prevent direct access to the one or more respective hardware resources while allowing indirect access to the one or more respective hardware resources for said at least one unsigned software content component, wherein said one or more virtualized hardware interfaces are managed by an access layer comprising a first buffer maintained in a user mode into which commands issued by said at least one unsigned software content component are stored, and a second buffer maintained in a supervisor mode into which the commands stored in the first buffer are copied, wherein the access layer validates the copied commands in the second buffer prior to allowing the commands to execute and access the one or more respective hardware resources.

12. The computer readable storage medium according to claim 11, further comprising assigning a unique user identification to said closed computing device and tracking any violations of said closed computing device via said unique user identification.

13. The computer readable storage medium according to claim 11, further comprising using said access layer, wherein said access layer corresponds to at least one of a graphics layer, an audio layer, an input layer, and a storage layer.

14. The computer readable storage medium according to claim 13, further comprising configuring at least one of said graphics layer, said audio layer, said input layer, and said storage layer to comprise of the first buffer into which commands associated with said at least one unsigned software content component are stored, and the second buffer into which commands are copied from said first buffer, and wherein said commands are validated in the second buffer.

15. The computer readable storage medium according to claim 14, further comprising providing said commands, upon said validation, to resources associated with said closed computing device.

16. The computer readable storage medium according to claim 11, further comprising providing said at least one unsigned software content component to said closed computing device using one of (a) dynamic communication from a computing device and (b) streaming from said computing device.

* * * * *